United States Patent [19]

Takagi

[11] Patent Number: 4,707,785
[45] Date of Patent: Nov. 17, 1987

[54] ELECTRONIC CASH REGISTER WITH MEANS TO ENTER DISCOUNT PRICES DIRECTLY BY KEYBOARD

[75] Inventor: Hiroshi Takagi, Kyoto, Japan

[73] Assignee: Omron Tateisi Electronics Co., Kyoto, Japan

[21] Appl. No.: 759,744

[22] Filed: Jul. 29, 1985

[30] Foreign Application Priority Data

Jul. 27, 1984 [JP] Japan ................................ 59-158123

[51] Int. Cl.[4] ........................ G06F 15/21; G07G 1/00
[52] U.S. Cl. .................................... 364/405; 235/378
[58] Field of Search ....................... 235/378, 385, 423; 364/405

[56] References Cited

U.S. PATENT DOCUMENTS

| | | | |
|---|---|---|---|
| 4,180,206 | 12/1979 | Takahashi | 235/419 |
| 4,399,508 | 8/1983 | Nakatani | 364/405 |
| 4,419,738 | 12/1983 | Takahashi | 364/405 |
| 4,468,750 | 8/1984 | Chamoff | 364/405 |
| 4,500,880 | 2/1985 | Gomersall | 364/464 |
| 4,518,852 | 5/1985 | Stockburger | 364/405 |
| 4,521,677 | 6/1985 | Sarwin | 235/385 |

FOREIGN PATENT DOCUMENTS 0146965 9/1983 Japan .................................. 364/405

Primary Examiner—Jerry Smith
Assistant Examiner—Gail Hayes
Attorney, Agent, or Firm—Schwartz, Jeffery, Schwaab, Mack, Blumenthal & Evans

[57] ABSTRACT

In an electronic cash register including memory means containing a PLU file in which the fixed price data for a commodity item is previously stored, a keyboard including a PLU key which, when activated, recalls the fixed price data for the appropriate commodity item from the PLU file and a ten-key pad, and a printer for printing out the data on the receipt slip, whereby the entry operation is performed by operating the keys on the keyboard, it further comprises an identifying key provided on said keyboard and activated to identify the price data entered from said keyboard as the new price data, wherein a difference between the new price data as entered by using the ten-key pad on the keyboard and identified by activating said identifying key and the fixed price data for the appropriate item recalled from the PLU file is calculated, and said new price data and difference data as well as said fixed price data stored in the PLU file are printed out on the receipt slip.

3 Claims, 8 Drawing Figures

FIG. 5A
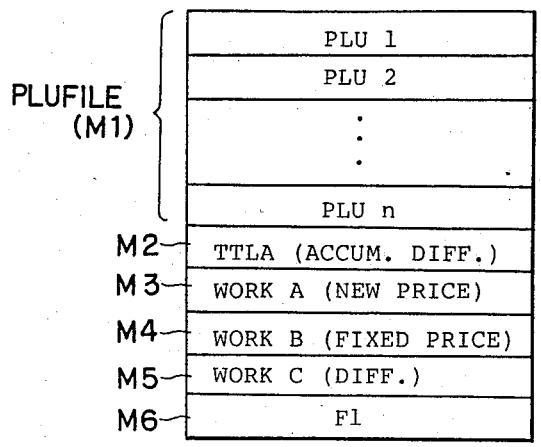
FIG. 5B
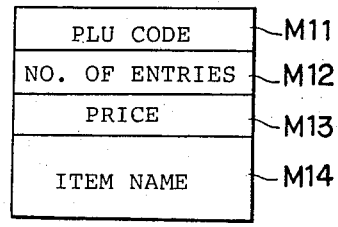
FIG. 6
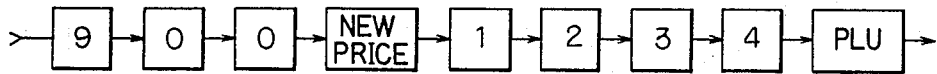
FIG. 7
```
OLD PRICE    1,000
DISCOUNT     -100
COFFEE         900
```

ELECTRONIC CASH REGISTER WITH MEANS TO ENTER DISCOUNT PRICES DIRECTLY BY KEYBOARD

BACKGROUND OF THE INVENTION

1. Field of the Invention

The present invention relates to an electronic cash register (which is hereinafter referred to as "ECR") which contains a PLU (price look-up) file designed to store the specific parameter values associated with each class of commercial commodity item as the PLU data (such as the item price value, the number of entries, the item name, etc.).

2. Description of the Prior Art

There is known an ECR that provides the PLU recording facilities (which are, by definition, those functions that allow every sold item to be recorded by referencing the relevant PLU data stored in the PLU file). However, the kind of the price for each item that can be set and stored as the PLU data by the conventional machine is limited to one (which price is referred to as "tag price not discounted" or "fixed price"). It does not allow the price for a particular item to be sold at a discount to be keyed-in directly from the keyboard. When the discount item is recorded, therefore, it is the practice that the applicable discount rate for its fixed price is entered into the ECR, from which the ECR calculates the new price (discounted price) and displays its output (actual sales price). For the customer using the coupon ticket, when the items sold and temporarily paid for by that customer are recorded, the applicable discount amount or discount rate that the customer benefits from his or her coupon ticket is entered into the ECR, from which the ECR also calculates the discounted sales price. As the discounted sales price cannot be entered directly, as described above, it is required that at the time of recording the sold items, the operator calculate the applicable discount amount or discount rate manually or with any appropriate calculator and enter the result into the ECR, particularly when the tags for the discount items only show the discount price (sales price).

Although the conventional ECR may allow its calculated discount sales price to be provided on the display whenever the discount rate is applied for each particular item, it is impossible to obtain it on the hardcopy such as the receipt slip and the audit journal (which is kept by the shop for later auditing purposes), which only reflects the fixed price for the item. As such, the actual sales prices cannot be determined readily by looking at those hardcopies when they must be examined later.

SUMMARY OF THE INVENTION

In order to solve the problems mentioned in the preceding subsection, it is a principal object of the present invention to provide an ECR that, in response to the entry of the actual sales price for a particular item to which the discount rate applies, internally caluculates the difference between the fixed price and entered actual sales price, accumulates such differences for all applicable items and stores them, and prints out the fixed prices, actual sales prices and their differences on the hardcopies such as receipt slip and journal, as well as provides those data on the display.

Briefly described, the ECR according to the present invention includes a "NEW PRICE" key which, when depressed, allows the ECR to identify the price value entered on the keyboard as the "new price" value, an internal difference calculating means that calculates a difference value between the new price data as entered and identified by operating the "NEW PRICE" key and the corresponding fixed price data stored in the PLU file and retrieved therefrom, and a hardcopy printing unit that provides the new price and difference data, as well as the fixed price data stored in the PLU file, on the receipt slip and/or journal.

In its preferred form, it may be possible that the ECR provides the total amounts of the new prices and fixed prices for all items purchased by every customer, in addition to the above-mentioned data, on the receipt slip and/or journal. The ECR may include a particular storage area for storing the total of cumulative difference values that is obtained by adding up those values each time they occur. In this case, those cumulative difference records may be stored either on the individual customer basis or on the daily basis. The cumulative difference records which are stored in the storage area may be printed out on the receipt slip or may be printed on the audit journal for later use as a tool for the daily sales management strategy.

As readily understood from the foregoing description, the present invention simplifies the operations associated with the recording of the commodity items to which the discount rate applies, including the usual PLU data recording operations. The specific features of the present invention that simplify those particular operations include the "NEW PRICE" key that allows the entry of the new price, or discount sales price, when it is activated, the calculation of the difference value between the fixed price stored in the PLU file and the new price data, and the accumulation of the individual difference values. As an additional feature, the records of the new prices and differences as well as the records of the fixed prices can be printed on the receipt slip and/or journal, which may be used later for the auditing purposes.

BRIEF DESCRIPTION OF THE DRAWINGS

Those and other features and advantages of the present invention will become apparent from the detailed description of the several preferred embodiments that follows by referring to the accompanying drawings, in which:

FIGS. 5 (A) and (B) illustrate the memory organization and the PLU data file structure, respectively, with the different data stored in the corresponding storage areas;

FIG. 6 shows the keying-in sequence when the new price data is entered; and

FIG. 7 is an example of the printout (receipt slip) for the item to which the discount rate applies.

DESCRIPTION OF THE PREFERRED EMBODIMENTS

Figure 2:
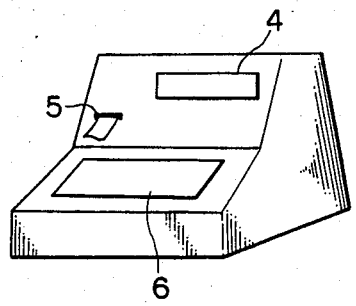
FIG. 2 is a perspective view of the ECR.
Figure 3:
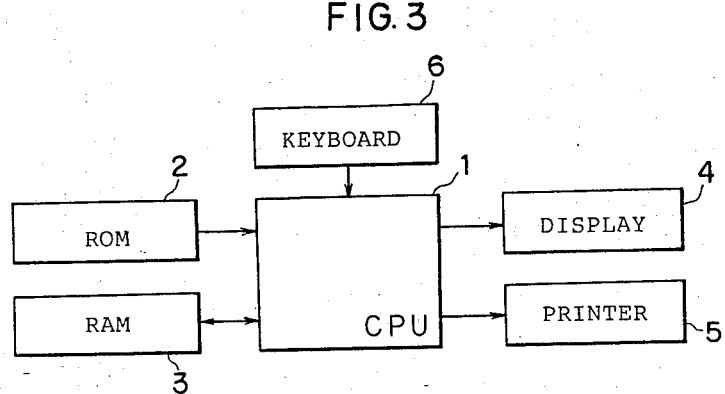
FIG. 3 is a block diagram showing the electronic component arrangement within the ECR.

FIG. 2 illustrates the geometrical outlook of the ECR in its preferred form. Referring then to FIG. 3, the electronic construction of the ECR shown in FIG. 2 is described. As shown by its block diagram, the ECR contains a central microprocessor or CPU 1, a ROM (read-only memory) 2 that contains program codes to be interpreted and executed by the CPU 1, a RAM (random-access memory) 3 on which a PLU file resides for storing multiple PLU data, a display 4 which indicates all relevant data such as the amount, price, in response to the PLU entry operation, and a printer 5 which prints out the same data as displayed on the receipt slip and/or audit journal, and a keyboard 6.

Figure 4:
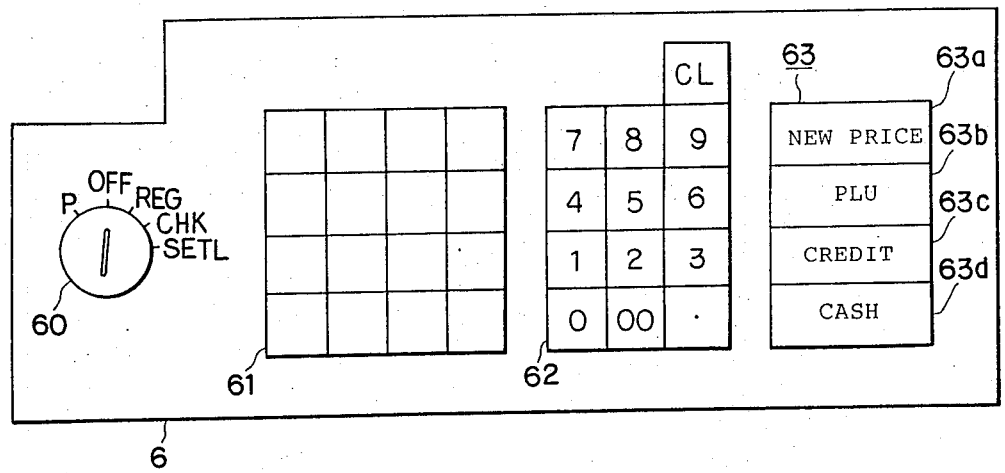
FIG. 4 illustrates the key arrangement on the keyboard.

FIG. 4 shows the key arrangement on the keyboard 6. The keys on the keyboard 6 include a key switch 60 which allows the operator to select any of the program mode (P), register mode (REG), check mode (CHK), and settle mode (SETL) by setting it to the appropriate position, a group of class keys 61 which are previously assigned to the corresponding class of the commodity items, a ten-key pad 62 that allows the operator to enter numerical data such as price data and PLU item code, and a group of function keys 63. The function keys 63 include the "NEW PRICE" key 63a which is used in conjunction with the entry of the actual sales price different from the PLU price (fixed price) and corresponds to the identifying key as claimed, the "PLU" key 63b, the "CREDIT" key 63c which is used for the credit-based transaction, and the "CASH" key 63d.

FIG. 5 (A) illustrates the storage area layout in the RAM 3. The RAM 3 consists of a storage area M1 in which a PLU file resides, a storage area M2 for storing the cumulative records of individual difference values, a storage area M3 which is used to store the actual sales price as new price data when the "NEW PRICE" key is operated and the new price data is entered, a storage area M4 for storing the fixed price data retrieved from the PLU file, a storage area M5 for storing the result of subtracting the new price from the fixed price, and a storage area M6 for containing a flag indicator F1 which, when set on, indicates that the new price data is stored in the storage area M3. All the storage areas except M1 and M6 are work areas, of which the storage area M2 is used when items are sold at a new (discount) prices and the total of cumulative differences between the fixed prices and new prices arising from such new price sales should be compensated for and settled. This is because the PLU file holds the fixed price and the number of entries, but not the new price data.

FIG. 5 (B) illustrates one area of areas in the PLU file, in which the relevant data specific to a commodity item is stored. As shown, the PLU file consists of an area M11 for holding the PLU item code for that commodity item, an area M12 which serves as an incremental counter that counts the number of entries each time that same item is registered, an area M13 for storing the fixed price for that item, and an area M14 for storing the identifier name or code of that item, from which it is retrieved for display and printout.

FIG. 6 shows an example of the keying-in sequence when a new price is entered. In this example, it is assumed that a commodity item has PLU item code of "1234" (fixed price of V1000) and is actually sold at a discount price of Y900.

Figure 1:
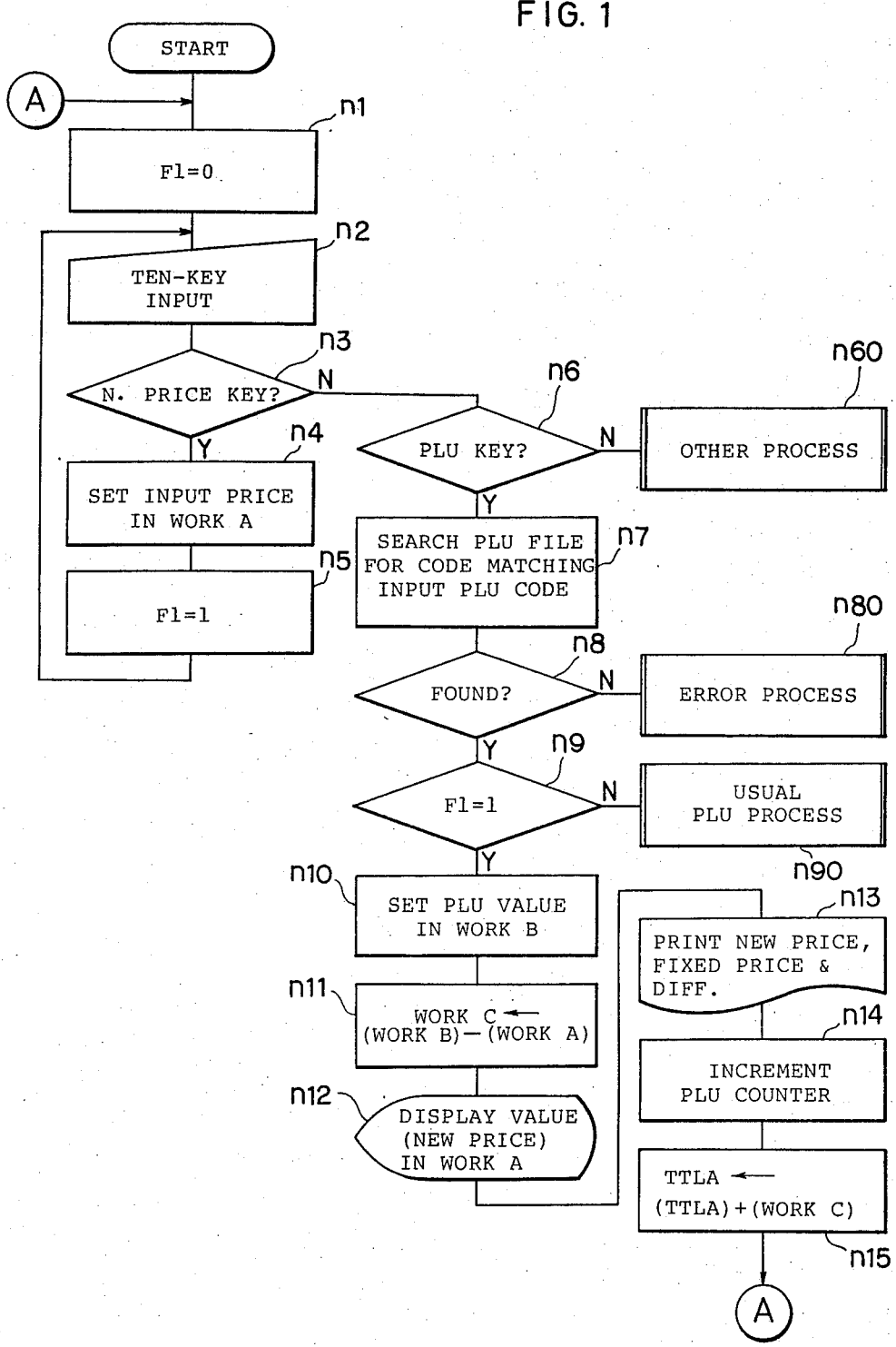
FIG. 1 is a flowchart showing the operational sequence of the electronic cash register (ECR) in its one preferred form of the present invention.

The operation of the ECR is described below with particular reference to the step-by-step procedure in the flowchart shown in FIG. 1.

The procedure starts with step n1 (which is hereinafter referred to simply as "nxx" where "xx" are digits) where the flag F1 is reset to zero. After the operator enters data by pressing the appropriate numerical keys (n2), the next step is to proceed to n3 where it is checked that the operator has activated the "NEW PRICE" key 63a, and if so, the path through n4 and n5 is followed, returning to n2. Otherwise, it steps forward to n6, where it is also checked that the "PLU" key 63b has been depressed. If so, the step n7 and succeeding steps are followed. If neither "NEW PRICE" key nor "PLU" key has been activated, n60 is chosen where other processing operations are to occur. When the "NEW PRICE" key 63a is depressed, the numerical data entered at n2 is stored in area M3 as the actual sales price (new price) (n4), and the flag F1 is set on (=1) to indicate that the new price has been entered. Then, it goes back to n2.

If the PLU item code is entered at n2 and the "PLU" key 63b is pressed at n6, the PLU file is searched for the data for the item with the PLU item code matching that as entered at n2 (n7). If the target data is found during this search, it proceeds to n9. If not found, it is determined that there is an error, which is processed by the error handling routine n80 (n8). At n9, the flag F1 is checked for its setting (on or off). If it is set on (=1), it proceeds to n10 and succeeding steps, where the PLU entry operation under the new price occurs, which is described in detail later. If set off, it goes to n90 where the usual PLU entry operation occurs.

The step n10 and succeeding steps apply to the PLU entry operation when the new price is entered. At n10, the "fixed price" data for the item, which has been retrieved from the PLU file, is stored in area M4. At n11 that follows n10, the "new price" data stored in area M3 is subtracted from the "fixed price" data, and the resulting difference is stored in area M5. At n12, the "new price" data is presented on the display 4, and at n13, the fixed price, new price and difference information is printed on the receipt slip and journal by the printer 5. FIG. 7 is an example of the printout on the receipt slip. Then, at n14, the counter in area M12 is incremented by one (1), and at n15, the current difference value is accumulated to any previous difference values in area M2. One cycle of the operation is concluded by returning to n1. The area M2 corresponds to means for storing the cumulative difference data as claimed.

If one customer purchases several different kinds or classes of commodity items, the above-described steps are repeated for each kind or class. In this case, the actual sales prices (area M3) and fixed price (area M4) are also accumulated to any respective previous values. (the storage area for those is not shown). Finally, depressing either the "CREDIT" key 63c or "CASH" key 63d causes the totals of the actual sales prices and fixed prices, and the accumulated difference value to be presented on the display 4 and printed on the printer 5. The totaling processing may be executed after either of the above keys is depressed.

For the items that are offered at their fixed prices, the difference calculation does not take place (going from n9 to n90). When the same customer purchases both the items to which the discount rate applies and non-discount items, the difference calculation (and accumulation) occurs only for the discount items and its total is presented.

When several identical items are purchased by the customer, their price total is obtained and presented simply by entering the number of the items. This is the same as for the conventional ECR.

The ECR that has been described provides many benefits and advantages when it is installed in the establishments such as supermarkets. The ECR can handle the discount items as well as the non-discount items. For the discount items, the operation involving the entry of the discount-rate applicable items and the calculation and accumulation of the discounted values (the differences) arising from the discount sales can be accomplished simply by entering the discount price (actual sales price) in conjunction with the "NEW PRICE" key. This can be done in the similar manner as for the usual PLU entry operation. As the data to be printed on the receipt slip and/or journal includes the discounted value (difference) and the discount sales price as well as the tag (fixed) price, those figures may be available simply by looking at the receipt slip and/or journal, and may be used for the auditing purposes.

Although the "NEW PRICE" key has been described as a single-function key, it may be used in conjunction with any other function key.

What is claimed is:

1. An electronic cash register including memory means containing a PLU file in which the fixed price data for a commodity item is previously stored, a keyboard including a PLU key which, when activated, recalls the fixed price data for the appropriate commodity item from the PLU file and a ten-key pad, and a printer for printing out the data on a receipt slip, whereby the entry operation is performed by operating the keys on the keyboard, which comprises:

an identifying key provided on said keyboard and activated to identify the price data entered from said keyboard as the new price data;

means for calculating a difference between the new price data as entered by using the ten-key pad on the keyboard and identified by activating said identifying key and the fixed price data for the appropriate item recalled from the PLU file; and means for printing out said new price data and difference data as well as said fixed price data stored in the PLU file on the receipt slip.

2. An electronic cash register as defined in claim 1, further including means for storing the cumulative difference data, which is accumulated and updated each time said new price entry operation occurs.

3. An electronic cash register as defined in claim 2, further including:

a second identifying key activated to identify the end of the entry operation;

means for accumulating the fixed price data recalled from the PLU file for each entry operation occurs;

means for printing the accumulated difference data, the accumulated fixed price total data, and the amount equal to the difference between those two data, when said second identifying key is activated.

* * * * *